United States Patent [19]

Iwakuni

[11] Patent Number: 5,469,287
[45] Date of Patent: Nov. 21, 1995

[54] LASER LIGHT RECEIVING DEVICE WITH IMPROVED NOISE DISCRIMINATION

[75] Inventor: Mikio Iwakuni, Ichikawa, Japan

[73] Assignee: Uniden Corporation, Ichikawa, Japan

[21] Appl. No.: 74,410

[22] Filed: Jun. 10, 1993

[30] Foreign Application Priority Data

Sep. 24, 1992 [JP] Japan ............................ 4-279444

[51] Int. Cl.⁶ .................................................. H04B 10/04
[52] U.S. Cl. ........................... 359/189; 359/184; 359/186
[58] Field of Search ..................................... 359/189, 193, 359/194, 180, 185, 186, 184; 375/22; 340/870.21

[56] References Cited

U.S. PATENT DOCUMENTS

| | | | |
|---|---|---|---|
| 3,867,628 | 2/1975 | Brown | 359/189 |
| 4,241,455 | 12/1980 | Eibner | 359/189 |
| 4,497,068 | 1/1985 | Fischer | 375/22 |
| 4,505,582 | 3/1985 | Zuleeg et al. | 372/25 |
| 4,601,064 | 7/1986 | Shipley | 359/189 |
| 4,713,841 | 12/1987 | Porter et al. | 359/158 |
| 5,142,142 | 8/1992 | Senechalle et al. | 250/227.23 |
| 5,260,563 | 11/1993 | Hunter et al. | 250/14 |
| 5,282,223 | 1/1994 | Muramatsu | 359/189 |

OTHER PUBLICATIONS

"LSD3–High Speed Laser Light Pulse Detector", Copyright Oct. 1982, Rev. 590, pp. 1–10.

*Primary Examiner*—Leo H. Boudreau
*Assistant Examiner*—Rafael Bacares
*Attorney, Agent, or Firm*—Stevens, Davis, Miller & Mosher

[57] ABSTRACT

For accurately detecting a desired laser signal without being affected by ambient noise light pulse, a laser signal receiving apparatus, which receives a light pulse transmitted from a laser transmitter, includes a light receiving section having a photo-electric converter for converting a light pulse into an electric pulse signal, a pulse-width detecting section for detecting a pulse-width of the pulse signal derived from the light receiving section and a controlling section having a counter port supplied with the pulse signal and a pulse-width detector port supplied with an output of the pulse-width detecting section, so as to count only the pulse signal having a predetermined pulse-width, based on an output of the pulse-width detecting section.

10 Claims, 4 Drawing Sheets

LASER LIGHT RECEIVING DEVICE WITH IMPROVED NOISE DISCRIMINATION

BACKGROUND OF THE INVENTION

1. Field of the Invention

The present invention relates to a laser light receiving apparatus, and particularly to such an apparatus which facilitates accurate reception of a desired laser light without being affected by ambient noise light.

2. Related Art Statement

The laser light receiving apparatus is used conventionally for the familiar door-sensor, but also for a counter or a sensor of bodies passing-through a certain area, a distance sensor, a speed sensor of moving bodies and the like. An outlined arrangement thereof is shown in FIG. 8.

The conventional laser light receiving apparatus as shown in FIG. 8 is composed of a light receiving section 1 having a photo-electric converter which consists of a photo-diode or the like for converting a received laser light into an electric pulse signal, a signal amplifying section 2 for amplifying the pulse signal derived from the light receiving section 1 to a predetermined level, a signal detecting section 3 for detecting the amplified pulse signal derived from the signal amplifying section 2 and an informing section 4 formed, for instance, of a loud speaker, which is driven by the signal detection section 3.

When the laser light receiving apparatus is used as a door sensor, a counter for bodies passing-through a given area and the like, an establishing circumstance is substantially the same, in which a received light signal is regular and stable, so that any light disturbance caused by noise light is not specially considered in the conventional condition.

Consequently, when the above mentioned conventional apparatus is used outdoors and further mounted on a moving body, the apparatus receives various noise lights and erroneous operation results. For example, when the day light is instantly blocked by an obstacle, that is, a street lamp, a guard rail, a suspension bridge or the like, a noise light pulse is caused by the variation of the input light in the conventional apparatus.

SUMMARY OF THE INVENTION

The present invention is conceived by referring to the above described circumstance. The structural feature thereof exists in a laser light receiving apparatus for receiving a light pulse transmitted from a laser transmitter, which comprises a light receiving section having a photo-electric converter for converting the light pulse into an electric pulse signal, a pulse-width detecting section for detecting a pulse width of the electric pulse signal derived from the light receiving section and a controlling section provided with a counter port receiving the electric pulse signal and a pulse-width detector port receiving an output of the pulse-width detecting section for counting the electric pulse signal, having a predetermined pulse-width on the basis of the output of said pulse-width detecting section.

It is preferable for this apparatus to place a pulse-width converting section for converting a pulse-width of the electric pulse signal derived from said light receiving section, so as to input the converted output pulse signal having the predetermined pulse-width into the counter port of the controlling section.

In addition, it is preferable also that the pulse-width detecting section be composed of a low-pass filter formed of a resistor and a capacitor, a comparator for comparing an output voltage of the low-pass filter with a reference voltage and a resetting circuit for discharging the capacitor, so as to apply a resetting signal derived from the controlling section at a predetermined interval to the resetting circuit.

Furthermore, when a noise light pulse signal, having a pulse-width, exceeding a reference width is detected in the pulse-width detecting section, an interval of a derived pulse signal is calculated from a received pulse train in the controlling section, so as to reproduce the desired pulse signal buried in the noise light pulse signal.

According to the above described structure, the pulse-width of the received light is detected in the pulse-width detecting section, so that, in the controlling section, any pulse signal having a pulse-width exceeding the reference width is not counted, and, as a result, the desired pulse signal only is counted.

In addition, when the pulse-width of the desired laser signal is, for instance, in the order of nano-seconds as a high speed pulse, the high speed pulse can be detected through a usually employed micro-computer by converting the pulse-width of the high speed pulse, for instance, into an order of micro seconds in the pulse-width converting section.

Moreover, in the controlling section, the intervals of received light pulses are, for example, stored or counted in a memory, and, among thus stored intervals, the interval which is the most frequently detected is assumed as the desired pulse interval, and further, when any noise light pulse having a pulse-width exceeding the reference width is detected in the pulse-width detecting section, it is assumed that the desired pulse signal is buried in the noise light pulse and it is recovered on the basis of the information mentioned in this paragraph.

BRIEF DESCRIPTION OF THE DRAWINGS

For the better understanding of the invention, reference is made to the accompanying drawings, in which.

Throughout different views of the drawings, 10 is a light receiving section, 11 is a signal amplifying section, 12 is a wave-form restoring section, 13 is a pulse-width converting section, 14 is a pulse-width detecting section, 15 is a CPU.

DESCRIPTION OF THE PREFERRED EMBODIMENTS

Preferred embodiments of the present invention will be described in detail by referring to the accompanying drawings hereinafter.

Figure 1:
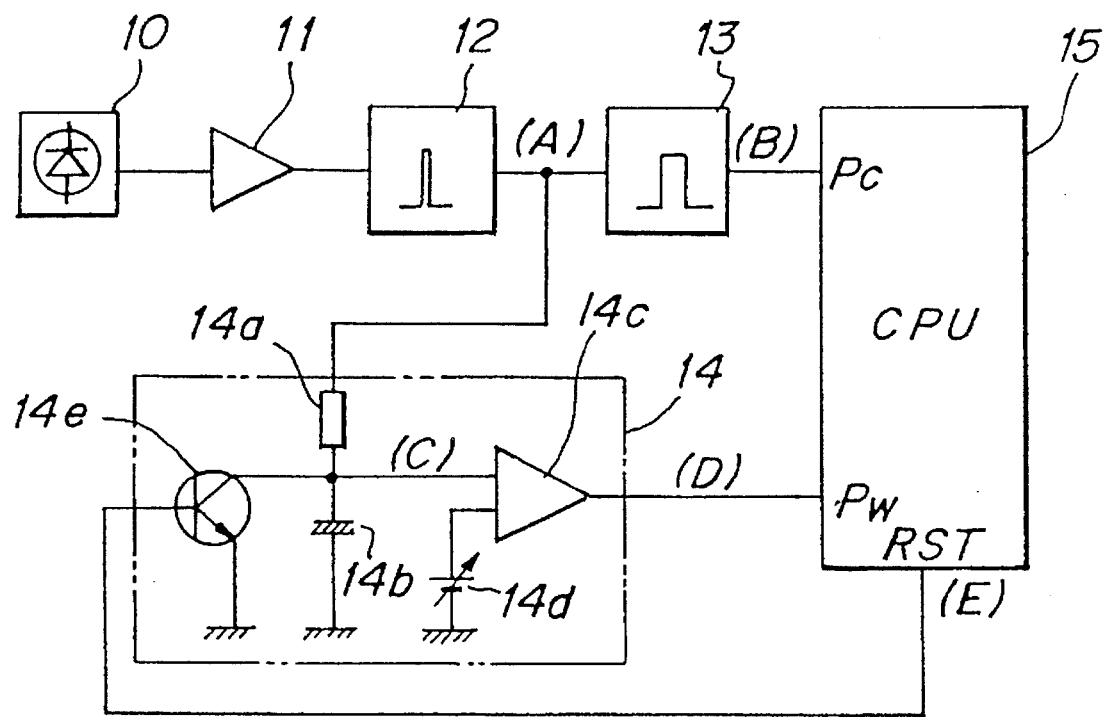
FIG. 1 is a block diagram showing a first embodiment of the invention.

FIG. 1 is a block diagram showing a first example of the laser signal receiving apparatus according to the present invention. This exemplified apparatus comprises a light receiving section 10, a signal amplifying section 11 for amplifying an output signal of the light receiving section 10 into a predetermined level, a waveform restoring section 12 for restoring a waveform of an amplified output signal of the signal amplifying section 11, a pulse-width converting section 13 for converting a pulse-width of a waveform-restored pulse signal into a predetermined width, a pulse-width detecting section 14 for detecting a pulse-width of the waveform restored pulse signal and a controlling section (CPU) 15 having a counter port Pc supplied with a pulse signal derived from the pulse-width converting section 13 and a pulse-width detector port Pw supplied with an output of the pulse-width detecting section 14.

In this exemplified apparatus, the light receiving section 10 is formed of a photo-diode, which converts a laser signal, a day light or an illuminate light which is regarded as a noise light and the like into an electric pulse signal. In this connection, the amount of the laser signal is smaller than that of the day light and the like, so that the light receiving section 10 is operated in response to the difference of light amount between these various lights.

The waveform restoring section 12 is formed, for instance, of a high speed comparator or a high gain amplifying system, in which an output of the signal amplifying section 11 is restored into a rectangular pulse form which can be digitally processed. In this regard, the waveform of the output thereof is equivalent to the waveform of the received light pulse.

In this exemplified apparatus, the pulse-width converting section 13 is formed of a one-shot multivibrator, so as to convert, for instance, a pulse width in the order of nano seconds into the order of micro seconds. In this connection, the output waveform of the one-shot multivibrator is raised at the same time with the rising edge of the input pulse waveform and falls later by a predetermined time duration from the trailing edge of the input pulse waveform.

The pulse-width detecting section 14 comprises a low-pass filter circuit formed of a resistor 14a and a capacitor 14b, a voltage comparator 14c formed of a comparator and a resetting circuit formed of a transistor 14e for discharging an electric charge stored in the capacitor 14b.

Figure 2:
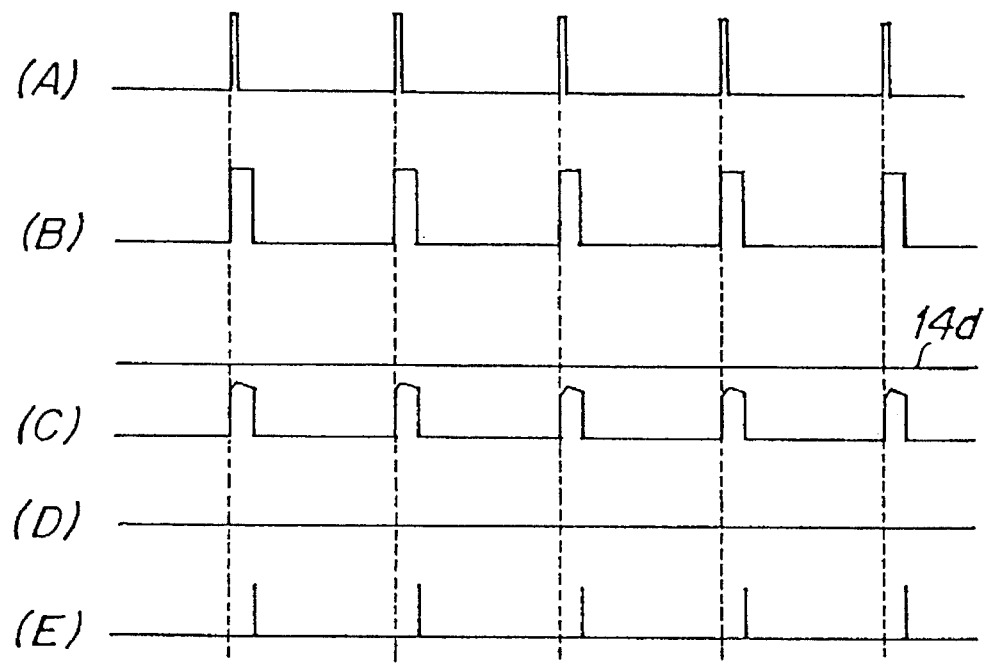
FIG. 2 is a timing chart showing an operation of the same.

The operation of this first example of the apparatus according to the present invention will be described by referring to a timing chart as shown in FIG. 2 hereinafter. In this regard, it is assumed that a laser signal having a pulse-width of 50 nsec and an interval of 3 msec is transmitted from the laser transmitter and then received by this apparatus.

When the above described laser signal is received by the light receiving section 10, a pulse signal having a pulse-width of 50 nsec and an interval of 3 msec, which are equivalent to those of the above laser signal, as shown in (A) of FIG. 2 is derived from the waveform restoring section 12.

For detecting the above described pulse signal, it is sufficient to effect the sampling at a high speed exceeding the pulse-width. However, in a conventional micro computer used for conventional signal processing, the limitation exists for the high speed sampling.

Accordingly, in this exemplified apparatus, the pulse-width of the pulse signal is converted into 250 μsec as shown in (B) of FIG. 2 through the pulse-width converting section 13, and thereafter the thus widened pulse signal is supplied to the counter port Pc of the CPU 15.

The pulse signals as shown in (A) of FIG. 2 is compared with the reference width in the pulse-width detecting section 14. That is, the pulse signal concerned is stored in the capacitor 14b of the low-pass filter circuit 14 as an electric charge, and, as a result, the charged voltage of the capacitor 14b is thus proportional to the pulse-width of the pulse signal.

In this exemplified apparatus, after a predetermined time duration from the incoming of the pulse signal into the counter port Pc, a resetting pulse as shown in (E) of FIG. 2 is supplied from the resetting port RST of the CPU 15 to the transistor 14e.

The voltage charged in the capacitor 14b is compared with a reference voltage 14d in a voltage comparator 14c. In the CPU 15, it is discriminated in response to the output of the voltage comparator 14c being either High or Low that the pulse-width concerned is more or less than the reference value.

This discrimination is effected immediately before the resetting pulse is supplied thereto. In this exemplified apparatus, the voltage of the capacitor 14b is lower than the reference voltage 14d with regard to any pulse signal as shown in (C) of FIG. 2, so that the output of the voltage comparator 14c is kept to Low as shown in (D) of FIG. 2 and hence the pulse-width is kept within the reference value. So that, the CPU 15 counts the pulse signal, under the discrimination that the presently incoming laser signal is desired.

On the contrary, when the output of the voltage comparator 14c remains High, this means that the pulse-width exceeds the reference value, and the CPU 15 stops the counting operation during the time that the output of the voltage comparator 14c is in the High-state.

Figure 3:
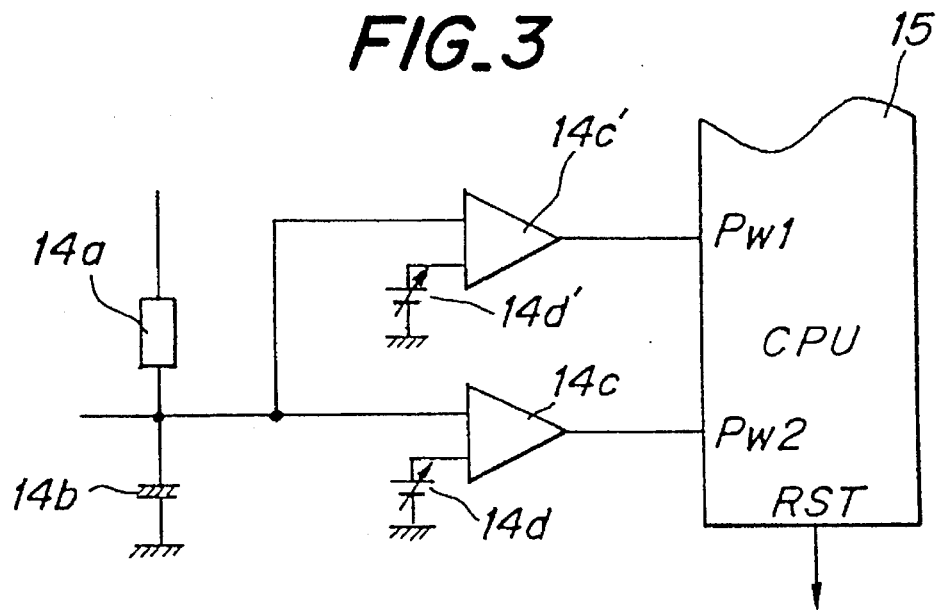
FIG. 3 is a block diagram showing a variation of a pulse-width detecting section of the same.

In this connection, as shown in FIG. 3, another voltage comparator 14c' similarly arranged as the voltage comparator 14c is provided in parallel with the latter and an upper threshold and a lower threshold are arranged by the comparing reference voltages 14d and 14d' respectively, so as to facilitate the precise detection of a laser light having the desired pulse-width.

In other words, when it is assumed that the comparing reference voltage 14d' is the upper threshold, while the comparing reference voltage 14d is the lower threshold and that the pulse-width detector port Pw1 is Low, while the other pulse-width detector port Pw2 is High, the incoming light can be discriminated as the laser light having the desired pulse-width.

Figure 4:
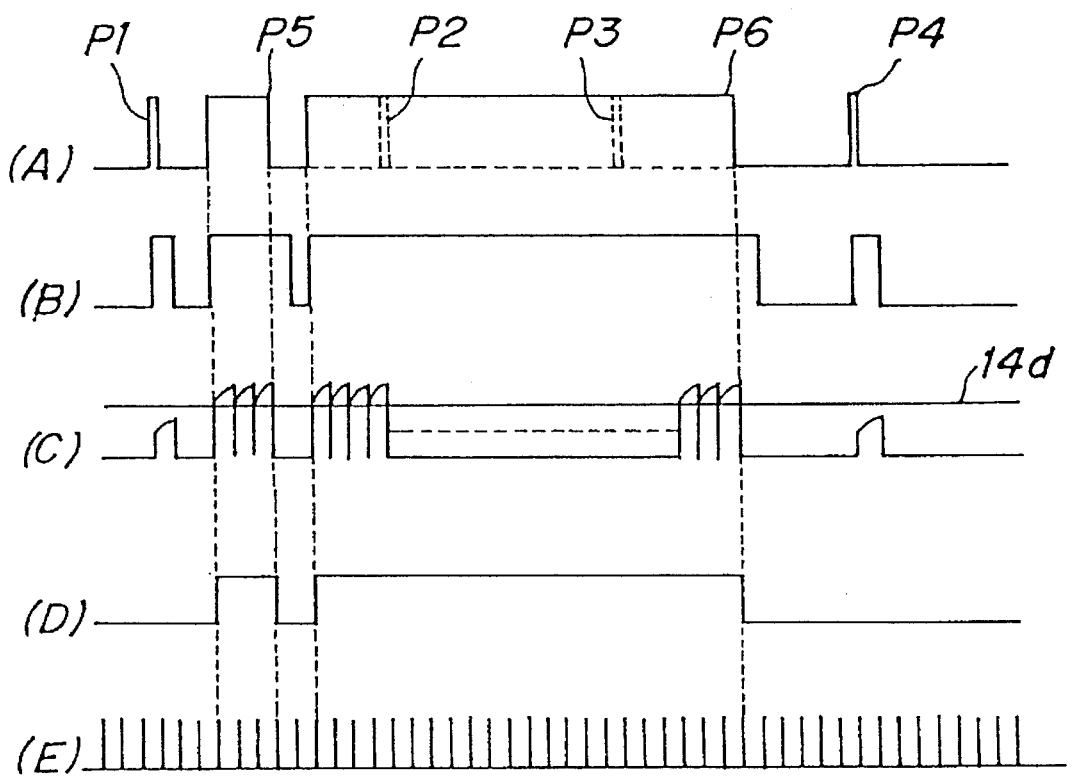
FIG. 4 is a timing chart showing an operation of the same when a noise light pulse is superposed.

In the next pulse, the signal processing in the case that any noise light pulse is superimposed on the incoming laser signal to be detected will be described by referring to a time chart as shown in FIG. 4.

In FIG. 4, pulse signals corresponding to the desired laser lights are denoted by P1 to P4, while noise light pulses are denoted by P5 and P6, two desired pulse signals P2 and P3 being assumed to be buried within the noise light pulse P6.

In this case also, the pulse-width of the pulse signals P1 to P4 is 50 nsec, while the interval thereof are 3 msec, and these pulse signals is supplied to the counter port Pc of the CPU 15 after being converted into the longer pulse-width in the pulse-width converting section 13. With this regard, in this case, the pulse signals P2 and P3 are buried within the noise light pulse P6, so that these pulse signals cannot be detected. With regard to the noise light pulses P5 and P6, the pulse-width thereof are expanded by 250 μsec in the pulse-width converting section 13.

In response to that, the pulse signals P1 to P4 are converted into the pulse-width of 250 μsec in the pulse-width converting section 13, and the sampling interval at the counter port Pc of the CPU 15 is set to 250 μsec. However, in this case, as shown in (E) of FIG. 4 with regard to the resetting pulse, the output is effected 3 μsec later than each sampling pulse, while the CPU 15 checks the pulse-width detector port Pw during this 3 μsec from the sampling point.

At the pulse signals P1 and P4, the output of the voltage comparator 14c is Low, so that the CPU 15 counts these pulse signals P1 and P4. On the contrary, at the noise light pulses P5 and P6, the charged voltage of the capacitor 14b in response to the pulse-width exceeds the reference voltage 14d as shown in (C) of FIG. 4, and, as a result, the output of the voltage comparator 14c becomes High as shown in (D) of FIG. 4, so that the CPU 15 does not count these noise light pulses P5 and P6.

Consequently, it results from the above that the pulse signals P2 and P3 to be detected are not counted also. However, in the exemplified apparatus, this defect is compensated as follows.

At the outset, the interval of the pulse signal generated from the laser light to be detected and the pulse-width of the noise light pulse are detected. In this case, for detecting the interval of the pulse signal, the pulses received in a predetermined time duration are memorized in a memory in each of the intervals concerned and, among the memorized intervals, the most frequently appearing interval is regarded as the interval of the pulse signal to be detected.

For example, 40 memory regions for counting the intervals are provided in the memory at every 1 msec from 1 msec to 40 msec, so as to detect the interval having the most count.

In this example, the count of memory regions of 3 msec is the most.

The pulse-width of the noise light pulse is detected in response to the condition of the output of the voltage comparator 14c, which is supplied to the pulse-width counter port Pw of the CPU 15. That is, as shown in (D) of FIG. 4, the pulse-width concerned is detected in response to the number of the sampling effected within the time duration in which the voltage comparator 14c is High.

Thereafter, the detected pulse-width of the noise light pulse and the interval of the pulse signal to be detected are compared with each other. When the pulse-width of the noise light pulse is larger than the interval of the pulse signal, the pulse signals P2 and P3 buried within the noise light pulse P6 are counted on the basis of the pulse signals P1 and P4 which precedes and succeeds the noise light pulse respectively.

As described above, according to the present invention, the pulse signals having the desired pulse-width only are counted and further the desired pulse signal buried within the noise light pulse is artificially reproduced, so as to correct the number of pulse counting.

In the next place, other embodiments of the present invention will be described.

Figure 5:
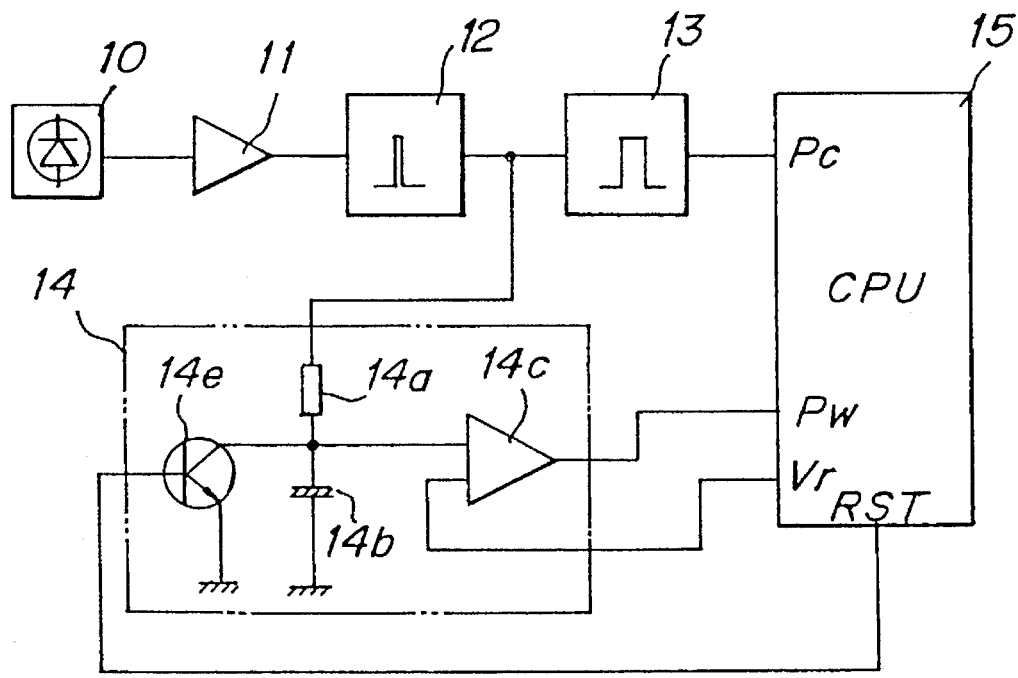
FIG. 5 is a block diagram showing a second embodiment of the invention.

In the second embodiment as shown in FIG. 5, the comparing reference voltage of the voltage comparator 14c is controlled by the CPU 15 and the pulse width to be detected can be adjusted as occasion demands.

Figure 6:
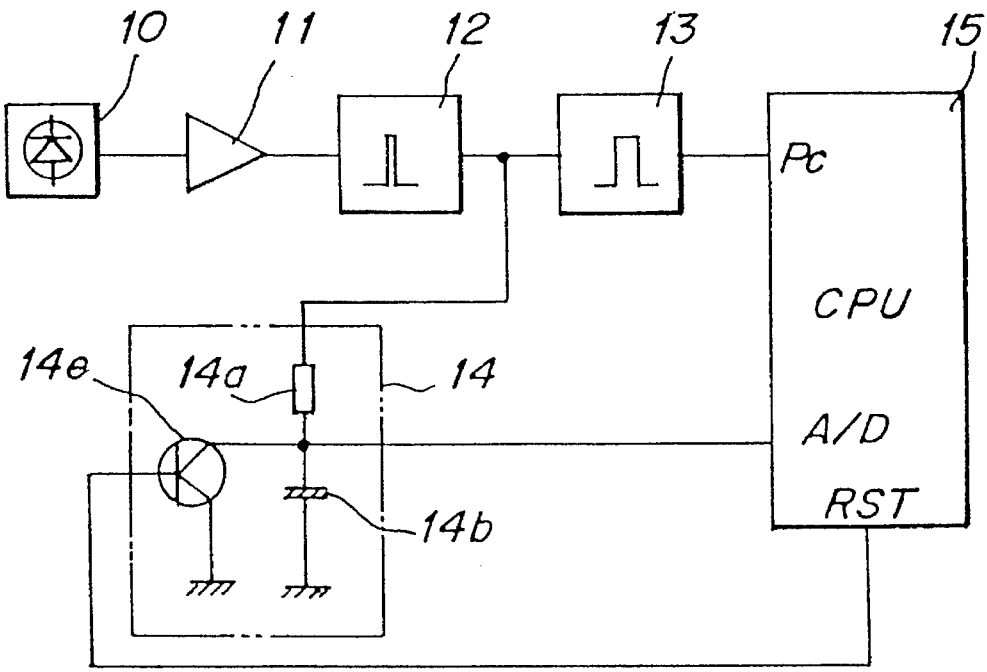
FIG. 6 is a block diagram showing a third embodiment of the invention.

In the third embodiment as shown in FIG. 6, an equipment comprising an A/D converter is used for the CPU 15 and the charged voltage of the capacitor 14b in the low-pass filter circuit is directly supplied to an A/D converter input port of the A/D converter, so as to detect the pulse-width from the digital data.

Figure 7:
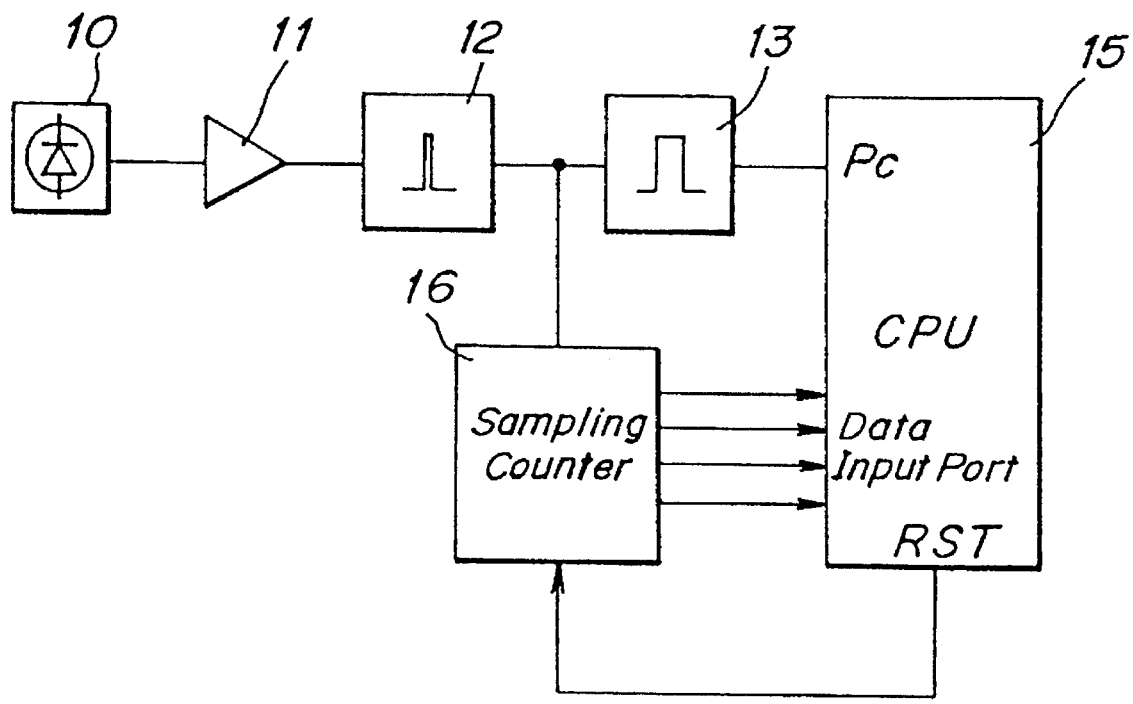
FIG. 7 is a block diagram showing a fourth embodiment of the invention.
Figure 8:
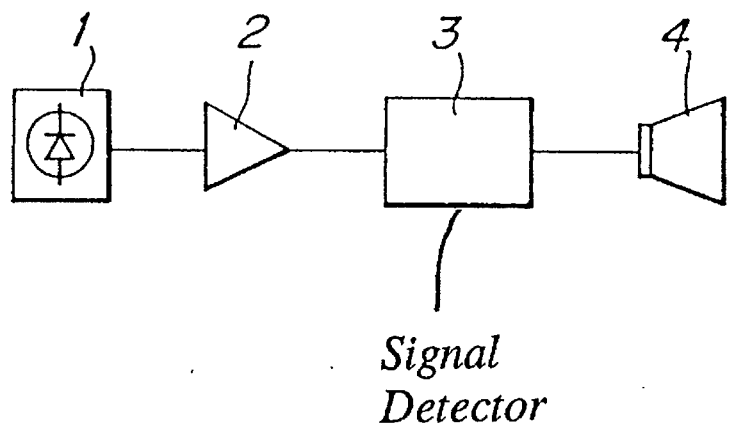
FIG. 8 is a block diagram showing a conventional laser light receiving apparatus as described before.

In the fourth embodiment as shown in FIG. 7, a high speed sampling counter is used for the pulse-width detecting section, so as to transmit pulse-width informations in the form of digital data to the CPU 15.

In this connection, although the pulse-width converting section 13 is provided in any of these embodiments, it is not required to intentionally provide the pulse-width converting section 13 in the case that it is possible to affect the high speed sampling, for instance, in the order of nano second in the CPU 15 itself.

As is apparent from the described above, according to the present invention, the pulse-width of a signal is detected in the pulse-width detecting section and it is intended that signals, whose pulse-width is other than the reference value, is not counted, so that, even in the case of the apparatus being used outdoors, it is possible to accurately count the pulse signal corresponding to the desired laser signal only. Moreover, the apparatus is not affected by ambient noise light pulse.

What is claim is:

1. A laser signal receiving apparatus for receiving light pulses transmitted from a laser transmitter, said apparatus comprising:

a light receiving section having a photo-electric converter for converting said light pulses into an electric pulse signal comprising a series of electric pulses;

a pulse-width detecting section for detecting a pulse-width of said series of electric pulses derived from said light receiving section; and a controlling section, including (i) a counter terminal receiving said series of electric pulses, and (ii) a pulse-width detector terminal receiving an output of said pulse-width detecting section, for counting said electric pulses having a predetermined pulse-width on the basis of said output of said pulse-width detecting section.

2. A laser signal receiving apparatus as claimed in claim 1, further comprising a pulse-width converting section for converting a pulse-width of said series of electric pulses derived from said light receiving section into said predetermined pulse-width, and inputting the converted electric pulses, having said predetermined pulse-width, into said counter terminal of said controlling section.

3. A laser signal receiving apparatus as claimed in claim 1, wherein said pulse-width detection section comprises a low-pass filter formed of a resistor and a capacitor, a comparator for comparing an output voltage of said low-pass filter with a reference voltage and a resetting circuit for discharging said capacitor, and said controlling section includes means for applying a resetting signal, at a predetermined interval, to said resetting circuit.

4. A laser signal receiving apparatus as claimed in claim 1, wherein, when said pulse-width detecting section detects an electric pulse corresponding to a noise light pulse signal having a pulse-width exceeding a reference width in said series of electric pulses, said controlling section calculates an interval between electric pulses desired to be counted from said series of electric pulses, whereby electric pulses that have said interval therebetween and that are embedded within said noise light pulse signal are counted by said controlling section.

5. A laser signal receiving apparatus as claimed in claim 2, wherein said pulse-width converting section comprises a one-shot multivibrator.

6. A laser signal receiving apparatus as claimed in claim 3, further comprising means for variably setting said reference voltage.

7. A laser signal receiving apparatus for receiving successive light pulses, said apparatus comprising:

a light receiving section having a photo-electric converter to convert said light pulses into successive electric pulse signals corresponding to said light pulses; and a controlling section to (i) detect time lengths between adjacent ones of said electric pulse signals and (ii) process data representing said time lengths to determine a representative time length of said time lengths.

8. The apparatus according to claim 7, wherein said representative time length comprises a most frequently occurring time length between adjacent ones of said electric pulse signals.

9. The apparatus according to claim 7, wherein said representative interval size constitutes an interval size between information signals of said electric pulse signals.

10. The apparatus according to claim 9, wherein said information signals are portions of the electric pulse signals excluding any noise that is present in said light pulses.

* * * * *